(12) United States Patent
Bridges et al.

(10) Patent No.: US 12,345,173 B2
(45) Date of Patent: Jul. 1, 2025

(54) GAS TURBINE ENGINES AND METHODS FOR REDUCING SPOOL THRUST IN A TURBINE SECTION THEREOF

(71) Applicant: HONEYWELL INTERNATIONAL INC., Charlotte, NC (US)

(72) Inventors: Eric Bridges, Phoenix, AZ (US); Mark Morris, Phoenix, AZ (US); Joseph Yanof, Phoenix, AZ (US); Partha Das, Phoenix, AZ (US); John McClintic, Phoenix, AZ (US); Steven Whitaker, Phoenix, AZ (US); Jason Smoke, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 44 days.

(21) Appl. No.: 18/519,691

(22) Filed: Nov. 27, 2023

(65) Prior Publication Data

US 2025/0172069 A1 May 29, 2025

(51) Int. Cl.
*F01D 3/00* (2006.01)
*F01D 21/14* (2006.01)
(Continued)

(52) U.S. Cl.
CPC .............. *F01D 3/00* (2013.01); *F01D 21/14* (2013.01); *F02C 7/06* (2013.01); *F02C 7/28* (2013.01);
(Continued)

(58) Field of Classification Search
CPC ... F01D 3/00; F01D 3/02; F01D 21/14; F04D 29/041; F04D 29/0413; F04D 29/05;
(Continued)

(56) References Cited

U.S. PATENT DOCUMENTS 4,477,088 A 10/1984 Picard
4,822,240 A * 4/1989 Marshall ................. F16C 39/04
415/105

(Continued)

FOREIGN PATENT DOCUMENTS

GB 809793 3/1959
GB 878400 9/1961
(Continued)

OTHER PUBLICATIONS

Chupp, Raymond E., et al., "Sealing in Turbomachinery," National Aeronautics and Space Administration, NASA/TM-2006-214341, Aug. 2006.

*Primary Examiner* — Topaz L. Elliott
(74) *Attorney, Agent, or Firm* — Lorenz & Kopf, LLP

(57) ABSTRACT

Gas turbine engines and methods for reducing spool thrust in a turbine section thereof are provided. The engines include a turbine disk, a shaft coupled to the turbine disk, an inner cavity downstream of the turbine disk, a thrust bearing assembly mechanically coupled to the shaft, a seal assembly having a seal land, and a controller. The controller is configured to detect a loss of oil event to the thrust bearing assembly and, in response: actuate the seal assembly to move the seal land toward a downstream face of the turbine disk to form a continuous axial seal about the inner cavity, supply a pressurized gas to the inner cavity to increase pressure in therein to an extent greater than an operating pressure thereof, and maintain the axial seal and the pressure within the inner cavity and thereby reduce the axial loads on the shaft.

20 Claims, 5 Drawing Sheets

(51) Int. Cl.
*F02C 7/06* (2006.01)
*F02C 7/28* (2006.01)

(52) U.S. Cl.
CPC ...... *F05D 2220/32* (2013.01); *F05D 2240/52* (2013.01); *F05D 2240/55* (2013.01); *F05D 2270/09* (2013.01)

(58) Field of Classification Search
CPC .......... F04D 29/0513; F02C 7/28; F02C 7/06; F05D 2240/52; F05D 2240/55; F05D 2270/09
See application file for complete search history.

(56) References Cited

U.S. PATENT DOCUMENTS

| | | | |
|---|---|---|---|
| 5,791,868 A | 8/1998 | Bosley et al. | |
| 6,367,241 B1 * | 4/2002 | Ress, Jr. | F04D 29/0516 415/105 |
| 8,104,972 B2 | 1/2012 | Maguire | |
| 8,434,994 B2 * | 5/2013 | Pal | F02C 3/06 415/199.5 |
| 8,459,969 B2 | 6/2013 | Matsukuma | |
| 8,480,352 B2 * | 7/2013 | Zheng | F01D 3/04 415/113 |
| 9,394,799 B1 | 7/2016 | Mills et al. | |
| 9,849,992 B2 | 12/2017 | Goodman et al. | |
| 10,012,315 B2 | 7/2018 | Barger et al. | |
| 10,234,036 B2 | 3/2019 | Lewis | |
| 10,443,443 B2 | 10/2019 | Ullah et al. | |
| 10,513,938 B2 | 12/2019 | Witlicki et al. | |
| 10,513,939 B2 | 12/2019 | Roberge | |
| 10,677,087 B2 | 6/2020 | Kang | |
| 11,702,958 B2 | 7/2023 | Schimmels et al. | |
| 2011/0027064 A1 * | 2/2011 | Pal | F02C 3/06 415/110 |
| 2011/0314817 A1 * | 12/2011 | Zheng | F01D 3/02 60/661 |
| 2015/0330220 A1 * | 11/2015 | Asti | F01D 3/04 415/104 |
| 2022/0162993 A1 | 5/2022 | Sawyers-Abbott et al. | |
| 2023/0090415 A1 | 3/2023 | Miller et al. | |

FOREIGN PATENT DOCUMENTS

| | | |
|---|---|---|
| KR | 101784304 B1 * | 10/2017 |
| WO | 2019045590 A1 | 3/2019 |

* cited by examiner

GAS TURBINE ENGINES AND METHODS FOR REDUCING SPOOL THRUST IN A TURBINE SECTION THEREOF

TECHNICAL FIELD

The present invention generally relates to gas turbine engines, and more particularly relates to systems and methods for extending an operating life of a thrust bearing assembly during a postulated loss of oil event.

BACKGROUND

Gas turbine engines typically employ both roller and thrust bearing assemblies to maintain robust rotor concentricity and axial position with respect to surrounding static structures. For example, thrust bearing assemblies are configured to mitigate axial loads on the spool(s) that result from the various airfoils and disk cavities. Heat generation occurs in the thrust bearing assembly and is a function of thrust loading. This heat is removed by an oil coolant system.

Though highly unlikely, it is postulated that a loss of oil event could occur during operation of the gas turbine engine. During such a postulated event, oil would no longer be supplied to the thrust bearing assembly, heat would still generated in the bearings, but heat dissipation would be significantly reduced. In some cases, it is postulated that this may result in a rapid rise in bearing temperature and a subsequent failure of the bearing due to overtemperature.

Hence, there is a need for systems and methods capable of promoting an extended operating life of a thrust bearing assembly during a postulated loss of oil event. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various embodiments, a gas turbine engine is provided that includes a turbine disk, a shaft coupled to the turbine disk, a turbine disk inner cavity downstream of the turbine disk, a thrust bearing assembly mechanically coupled to the shaft and configured to mitigate axial loads on the shaft during operation of the gas turbine engine, a back-pressuring seal assembly having a seal land, and a controller. The controller is configured to, by one or more processors, detect a loss of oil event to the thrust bearing assembly during operation of the gas turbine engine. In response to detecting the loss of oil event, the controller is configured to, by the one or more processors: actuate the back-pressuring seal assembly to move the seal land toward a downstream face of the turbine disk such that the seal land forms a continuous axial seal about the turbine disk inner cavity, supply a pressurized gas to the turbine disk inner cavity to increase a gas pressure in the turbine disk inner cavity to an extent greater than an operating gas pressure of the turbine disk inner cavity, and maintain the axial seal and the gas pressure within the turbine disk inner cavity while the gas turbine engine is operating and thereby reduce the axial loads on the shaft.

In various embodiments, a method is provided that includes detecting a loss of oil event to a thrust bearing assembly of a gas turbine engine during operation of the gas turbine engine, wherein the gas turbine engine includes a turbine disk, a shaft coupled to the turbine disk, and a turbine disk inner cavity downstream of the turbine disk, wherein the thrust bearing assembly is configured to mitigate axial loads on the shaft during operation of the gas turbine engine. In response to detecting the loss of oil event, the method includes actuating, by a controller having one or more processors, a back-pressuring seal assembly to move a seal land of the back-pressuring seal assembly toward a downstream face of the turbine disk such that the seal land forms a continuous axial seal about the turbine disk inner cavity, supplying a pressurized gas to the turbine disk inner cavity to increase a gas pressure in the turbine disk inner cavity to an extent greater than an operating gas pressure of the turbine disk inner cavity, and maintaining the axial seal and the gas pressure within the turbine disk inner cavity while the gas turbine engine is operating and thereby reduce the axial loads on the shaft.

Furthermore, other desirable features and characteristics of the gas turbine engine and the method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods disclosed herein provide a spool thrust reduction system configured to promote extended operation of a gas turbine engine during a loss of oil event. In general, the spool thrust reduction system may seal one or more cavities of the gas turbine engine, such as a turbine disk cavity, and pressurize such cavities with a pressurized gas to an extent sufficient to significantly reduce thrust loading on various components of the gas turbine engine.

In various embodiments, the gas turbine engine may be a component of a mobile platform and extended operating life of the gas turbine engine may promote safety for any passengers of the mobile platform. In such embodiments, the mobile platform may be any type of vehicle, such as but not limited to various types of aircraft. It should be noted that the term aircraft, as utilized herein, may include any manned or unmanned object capable of flight. Examples of aircraft may include, but are not limited to, fixed-wing aerial vehicles (e.g., propeller-powered or jet powered), rotary-wing aerial vehicles (e.g., helicopters), manned aircraft, unmanned aircraft (e.g., unmanned aerial vehicles, or UAVs), delivery drones, etc.

Figure 1:
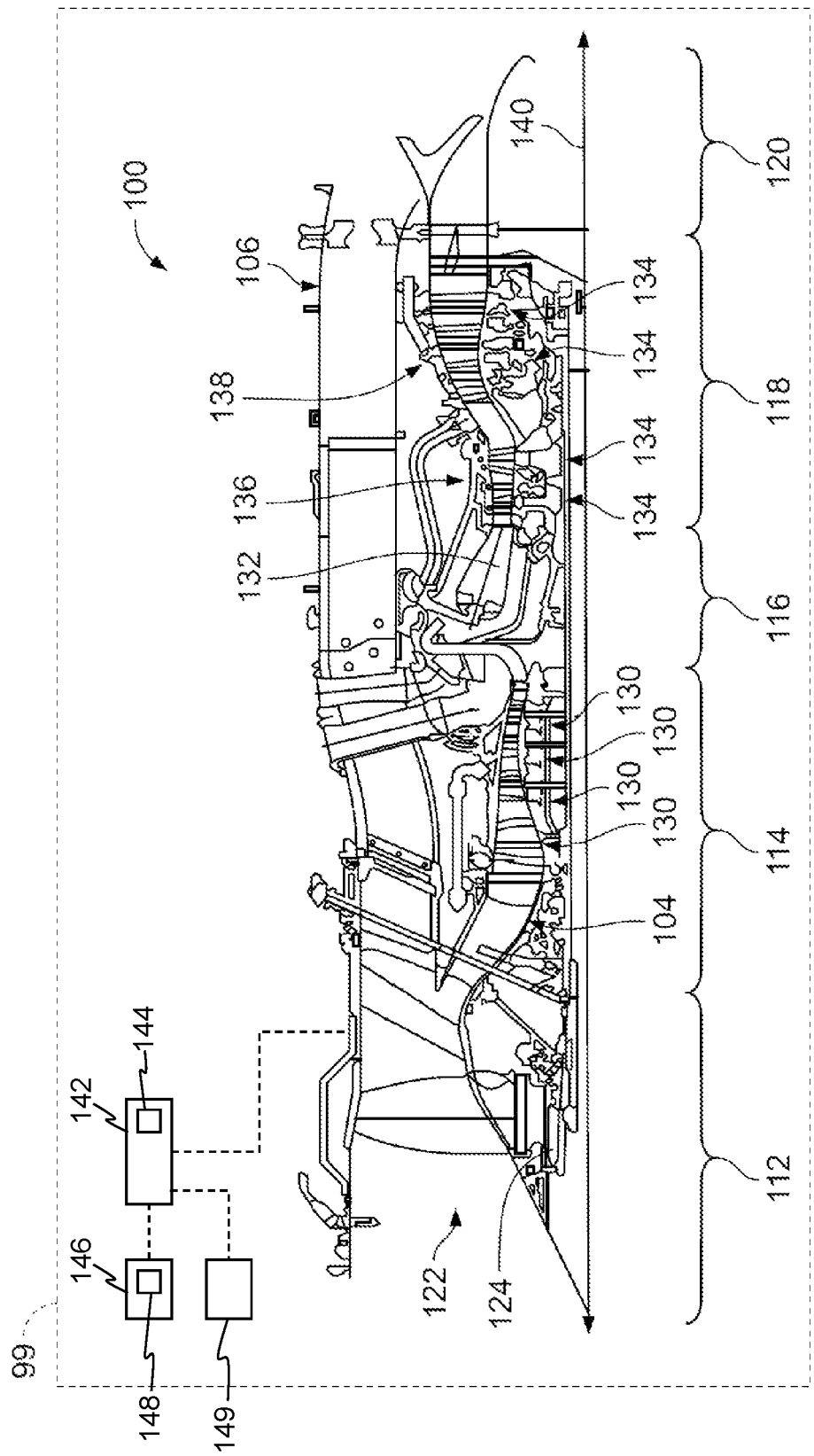
FIG. 1 is a schematic cross-sectional illustration of a gas turbine engine, which includes an exemplary spool thrust reduction system in accordance with the embodiments.

With reference to FIG. 1, a partial, cross-sectional view of an exemplary gas turbine engine 100 is shown with the remaining portion of the gas turbine engine 100 being substantially axisymmetric about a longitudinal axis 140, which also comprises an axis of rotation for the gas turbine engine 100. In the depicted embodiment, the gas turbine engine 100 is an annular multi-spool turbofan gas turbine jet engine within an aircraft 99, although other arrangements and uses may be provided.

In this example, with continued reference to FIG. 1, the gas turbine engine 100 includes a fan section 112, a compressor section 114, a combustor section 116, a turbine section 118, and an exhaust section 120. In one example, the fan section 112 includes a fan 122 having a plurality of fan blades annularly mounted on a rotor hub of a rotor 124 that draws air into the gas turbine engine 100 and compresses and/or accelerates the air into an air stream. A fraction of the air stream accelerated from the fan 122, referred to herein as a primary air stream, is directed through an inner core duct 104 into the compressor section 114 and the remaining fraction of air accelerated by the fan 122, referred to herein as a secondary air stream, is directed through an outer bypass duct 106 to an outlet.

In the embodiment of FIG. 1, the compressor section 114 includes one or more compressors 130. The number of compressors 130 in the compressor section 114 and the configuration thereof may vary. The one or more compressors 130 sequentially raise the pressure of the air and direct a majority of the high pressure air into the combustor section 116. A fraction of the compressed air bypasses the combustor section 116 and is used to cool, among other components, turbine blades in the turbine section 118.

In the embodiment of FIG. 1, in the combustor section 116, which includes a combustion chamber 132, the high pressure air is mixed with fuel, which is combusted. The high-temperature combustion air or combustive gas flow is directed into the turbine section 118. In this example, the turbine section 118 includes one or more turbines 134 disposed in axial flow series. It will be appreciated that the number of turbines 134, and/or the configurations thereof, may vary. The combustive gas expands through and rotates the turbines 134. The combustive gas flow then exits turbine section 118 for mixture with the cooler bypass airflow from the bypass duct 106 and is ultimately discharged from gas turbine engine 100 through exhaust section 120. As the turbines 134 rotate, each drives equipment in the gas turbine engine 100 via concentrically disposed shafts or spools. Generally, the turbines 134 in the turbine section 118, the compressors 130 in the compressor section 114 and the fan 122 are mechanically linked by one or more shafts or spools. For example, in a two spool turbofan engine platform, the turbine rotors contained within a high pressure (HP) turbine stage 136 may be rotationally fixed to the compressors 130 contained within compressor section 114 by a HP shaft, while the turbines 134 contained within a low pressure (LP) turbine stage 138 may be rotationally fixed to the rotor 124 of the fan 122 by a coaxial LP shaft. In other embodiments, gas turbine engine 100 may be a single spool engine or a multi-spool engine containing more than two coaxial shafts.

The aircraft 99 includes a spool thrust reduction system configured to extend the operating life of the gas turbine engine 100 during a postulated loss of oil event. The spool thrust reduction system includes a controller 142, a sensor system 146, a memory 149, a back-pressuring seal assembly 156, and various components configured to provide a pressurized gas to the back-pressuring seal assembly 156 and a turbine disk inner cavity 170.

The controller 142 is configured to manage or control various functions of the gas turbine engine 100. The term "controller," as appearing herein, broadly encompasses those components utilized to carry-out or otherwise support the processing functionalities associated with operation of one or more functions of the gas turbine engine 100. Accordingly, the controller 142 can encompass or may be associated with any number of individual processors, flight control computers, navigational equipment pieces, computer-readable memories (including or in addition to a memory 149), power supplies, storage devices, interface cards, and other standardized components.

In various embodiments, the controller 142 includes at least one processor 144, a communication bus, and a computer readable storage device or media. The processor performs the computation and control functions of the controller 142. The processor can be any custom made or commercially available processor, a central processing unit (CPU), a graphics processing unit (GPU), an auxiliary processor among several processors associated with the controller 142, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 142. The bus serves to transmit programs, data, status and other information or signals between the various components of the aircraft 99. The bus can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor, receive and process signals from a sensor system 146, perform logic, calculations, methods and/or algorithms, and generate data based on the logic, calculations, methods, and/or algorithms. Although only one controller 142 is shown in FIG. 1, embodiments of the aircraft 99 can include any number of controllers 142 that communicate over any suitable communication medium or a combination of communication mediums and that cooperate to process the sensor signals, perform logic, calculations, methods, and/or algorithms, and generate data. In various embodiments, the controller 142 includes or cooperates with at least one firmware and software program (generally, computer-readable instructions that embody an algorithm) for carrying-out the various process tasks, calculations, and control/display functions described herein. During operation, the controller 142 may be programmed with and execute at least one firmware or software program, for example, a program, which embodies one or more algorithms, to thereby perform the various process steps, tasks, calculations, and control/display functions described herein.

The memory 149 can encompass any number and type of storage media suitable for storing computer-readable code or instructions as well as other data generally supporting the operation of the gas turbine engine 100. As can be appreciated, the memory 149 may be part of the controller 142, separate from the controller 142, or part of the controller 142 and part of a separate system. The memory 149 can be any suitable type of storage apparatus, including various different types of direct access storage and/or other memory devices.

The sensor system 146 supplies various types of data and/or measurements to the controller 142. In various embodiments, the sensor system 146 supplies, without limitation, one or more operating parameters of the gas turbine engine 100 such as, but not limited to, rotational speeds, temperatures, pressures, vibrations, etc. The sensor system 146 may include one or more sensors 148 having various locations within or on the aircraft 99 and within or on the gas turbine engine 100.

Figure 2:
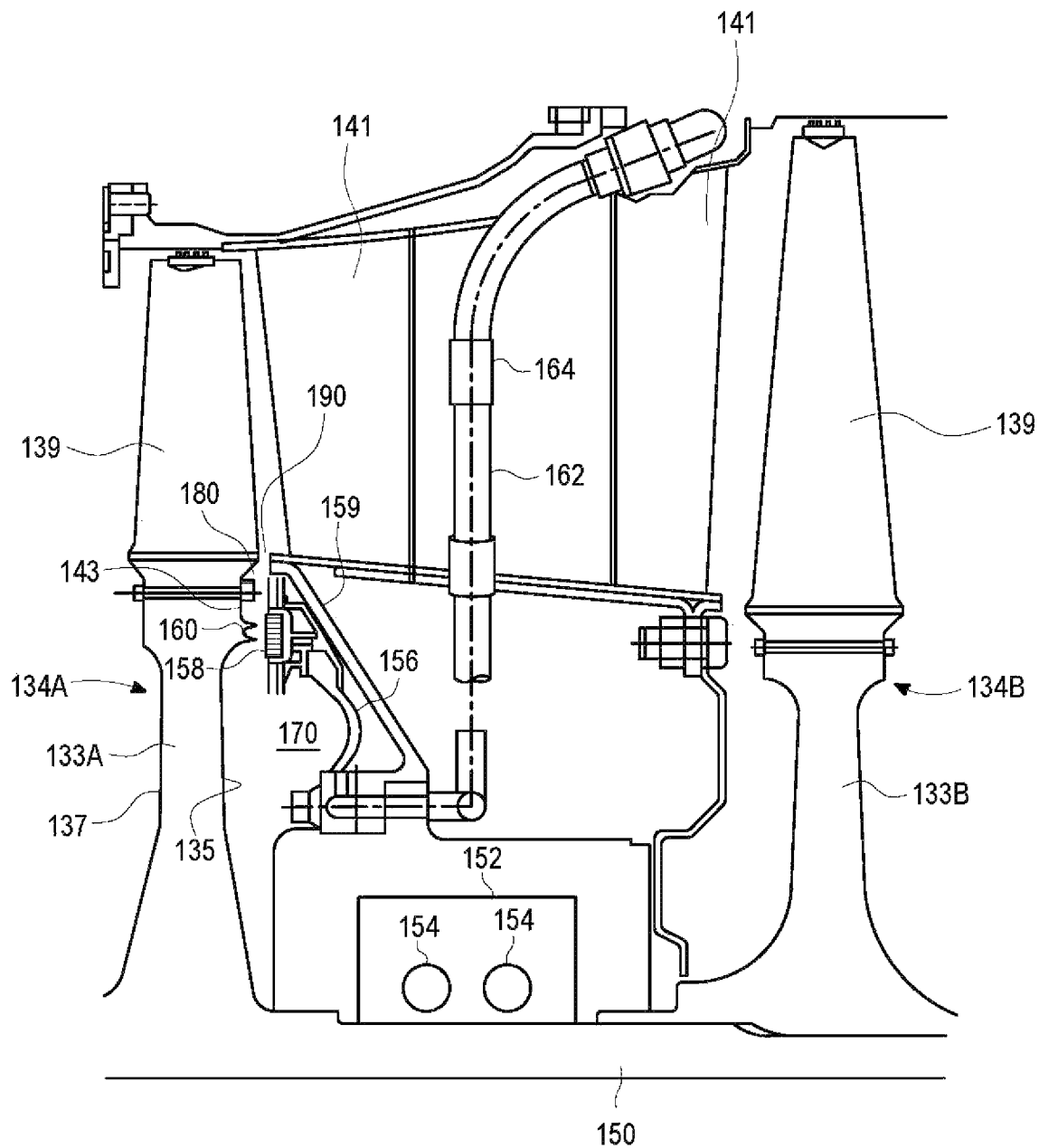
FIG. 2 is a detail cross-sectional view which illustrates certain components of the spool thrust reduction system of FIG. 1 in accordance with various embodiments.

With reference to FIG. 2, a detail view of a portion of the turbine section 118 is presented that includes, among other components, first and second turbines 134A and 134B that include first and second turbine disks 133A and 133B secured to a spool or shaft 150, and airfoils 139 coupled to radial ends of the first and second turbine disks 133A and 133B. The turbine section 118 also includes stators 141 between the airfoils 139, a thrust bearing assembly 152 between the first and second turbines 134a and 134B, and the back-pressuring seal assembly 156. In some embodiments, the thrust bearing assembly 152 may be located axially forward of the first turbine disk 133A or axially aft of the second turbine disk 133B. The turbine disk inner cavity 170 downstream of the first turbine disk 133A is defined by and between a lower portion 135 of a downstream face of the first turbine disk 133A that is radially inboard of knives 160 protruding axially from the downstream face of the of the first turbine disk 133A, portions of the back-pressuring seal assembly 156 that are radially inboard of the knives 160, other surfaces such as portions of the thrust bearing assembly 152 or shaft 150, structural components between the first and second turbines 134A and 134B, and/or the knives 160. A turbine disk outer cavity 180 downstream of the first turbine disk 133A is defined by and between an upper portion 143 of the downstream face of the first turbine disk 133A that is radially outboard of the knives 160, portions of the back-pressuring seal assembly 156 and adjacent structure 159 that are radially outboard of the knives 160, the knives 160, and a flow path axial gap 190 which is axially aft of the downstream face of the first turbine disk 133A.

The thrust bearing assembly 152 is configured to maintain robust rotor concentricity and axial position with respect to surrounding static structures during operation of the gas turbine engine 100. In particular, the thrust bearing assembly 152 includes one or more thrust bearings 154 configured to mitigate axial loads on the shaft 150 that result from the various airfoils 139 and from various compressor and turbine rotor cavities, such as the turbine disk inner cavity 170 and the turbine disk outer cavity 180. In this example, operation of the gas turbine engine 100 causes a cavity upstream of the first turbine disk 133A (i.e., the high pressure side) to have a first gas pressure that is greater than a second gas pressure within the turbine disk inner cavity 170 downstream of the first turbine disk 133A and that is greater than a third gas pressure within the turbine disk outer cavity 180 downstream of the first turbine disk 133A (i.e., the low pressure side). This pressure differential causes a greater force to be exerted by the gas on an upstream face 137 of the first turbine disk 133A than on the downstream face, which in turn applies a net aft force on the shaft 150. The thrust bearing assembly 152 is configured to mitigate this axial load with the thrust bearing(s) 154.

Heat generation occurs in the thrust bearing assembly 152 and is a function of thrust loading. This heat is removed by an oil coolant system (not shown) that provides a flow of oil through the thrust bearing assembly 152. During a postulated loss of oil event wherein oil is no longer supplied to the thrust bearing assembly 152, heat is still generated in the bearings 154, but heat dissipation is significantly reduced due to the lack of oil flow.

During normal operation of the gas turbine engine 100 (i.e., while oil is flowing to the thrust bearing assembly 152), a clearance or space is provided between a seal land 158 of the back-pressuring seal assembly 156 and the downstream face of the first turbine disk 133A that provides a flow path for gases to enter the turbine disk inner cavity 170. With this arrangement, there is little or no pressure differential immediately upstream of the seal land 158 relative to immediately downstream of the seal land 158, that is, between the pressure in the turbine disk inner cavity 170 and the pressure in the turbine disk outer cavity 180.

In response to detection of the loss of oil event, the controller 142 is configured to reduce a rate of temperature rise of the thrust bearing(s) 154 by actuating the back-pressuring seal assembly 156 to seal the turbine disk inner cavity 170 from the turbine disk outer cavity 180. The controller 142 is also configured to supply a pressurized gas to the turbine disk inner cavity 170 to increase the forward force applied to the shaft 150. This in turn reduces the aft thrust loading on the thrust bearing(s) 154 and thereby reduces the rate of temperature increase of the thrust bearings 154. In various embodiments, the operating life of the thrust bearing assembly 152 may be extended to last ten minutes or more after the loss of oil event, such as twenty minutes or more, such as thirty minutes or more.

The controller 142 may detect the loss of oil event by processing information received from one or more systems of the aircraft 99, such as sensor data received from the sensor system 146 indicative of observable conditions sensed by one or more of the sensors 148. For example, the sensor system 146 may communicate to the controller 142 that oil pressure within the thrust bearing assembly 152 and/or the oil coolant system has dropped below a preprogrammed oil pressure threshold corresponding to a loss of oil event. As another example, the sensor system 146 may communicate to the controller 142 that a temperature within the thrust bearing assembly 152 has increased above a preprogrammed temperature threshold or is increasing at a rate in excess of a preprogrammed temperature rate threshold.

The back-pressuring seal assembly 156 may be actuated in various manners. In various embodiments, the controller 142 supplies a pressurized gas to the back-pressuring seal assembly 156 to cause the seal land 158 of the back-pressuring seal assembly 156 to move axially toward the downstream face of the first turbine disk 133A. In some embodiments, the seal land 158 of the back-pressuring seal assembly 156 physically contacts and engages the downstream face of the first turbine disk 133A, such as the knives 160. In some embodiments, the seal land 158 of the back-pressuring seal assembly 156 is located within 10 mils (e.g., 0.254 mm) from the first turbine disk 133A to substantially or effectively form a seal between the turbine disk inner cavity 170 and the turbine disk outer cavity 180. In some embodiments, application of a differential pressure to the back-pressuring seal assembly 156 moves the seal land 158 axially toward the downstream face of the first turbine disk 133A in a direction normal to the flow path provided between the seal land 158 and the downstream face and thereby block the flow path.

In the example of FIG. 2, the controller 142 actuates a valve 164 to supply the pressurized gas through a conduit 162 to an internal cavity of the back-pressuring seal assembly 156. The pressurized gas interacts with one or more components of the back-pressuring seal assembly 156 to cause the seal land 158 to move axially toward the downstream face of the first turbine disk 133A. In various embodiments, the seal land 158 contacts the downstream face of the first turbine disk 133A to form a continuous axial seal against the downstream face, and thereby produces a pressure drop between the turbine disk inner cavity 170 and the turbine disk outer cavity 180. In various embodiments, the seal land 158 is configured to contact the knives 160 protruding axially from the downstream face of the of the first turbine disk 133A to form the axial seal. In some embodiments, the seal land 158 includes a honeycomb face configured to contact the knives 160.

In order to promote the axial seal against the downstream face, the seal land 158 may include or define a single, unitary, annular body that encircles the shaft 150 and is configured to simultaneously contact a ring-shaped portion of the downstream face about the shaft 150.

Application of the axial seal with the back-pressuring seal assembly 156 substantially isolates the turbine disk inner cavity 170 pneumatically from the turbine disk outer cavity 180 and thus transforms the turbine disk inner cavity 170 from an open cavity to a thrust piston cavity. This enables the turbine disk inner cavity 170 to be pressurized by the back-pressuring seal assembly 156, which increases the forward force on the downstream face of the first turbine disk 133A to enable a reduction in aft load on the shaft 150 and on the thrust bearings 154 of the thrust bearing assembly 152.

Figure 4:
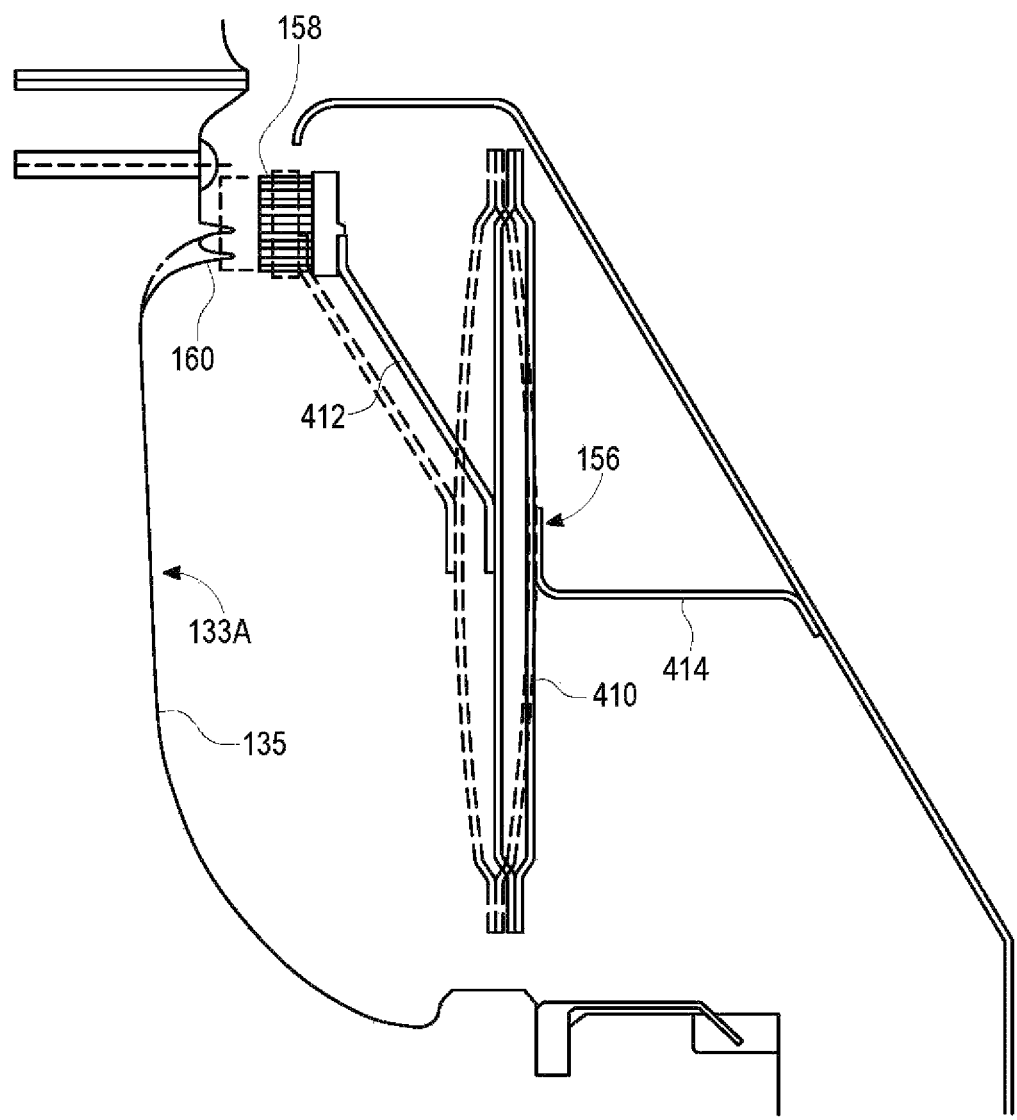
FIG. 4 is a detail cross-sectional view which illustrates certain components of an exemplary pressure actuated seal land having a diaphragm in accordance with various embodiments.
Figure 5:
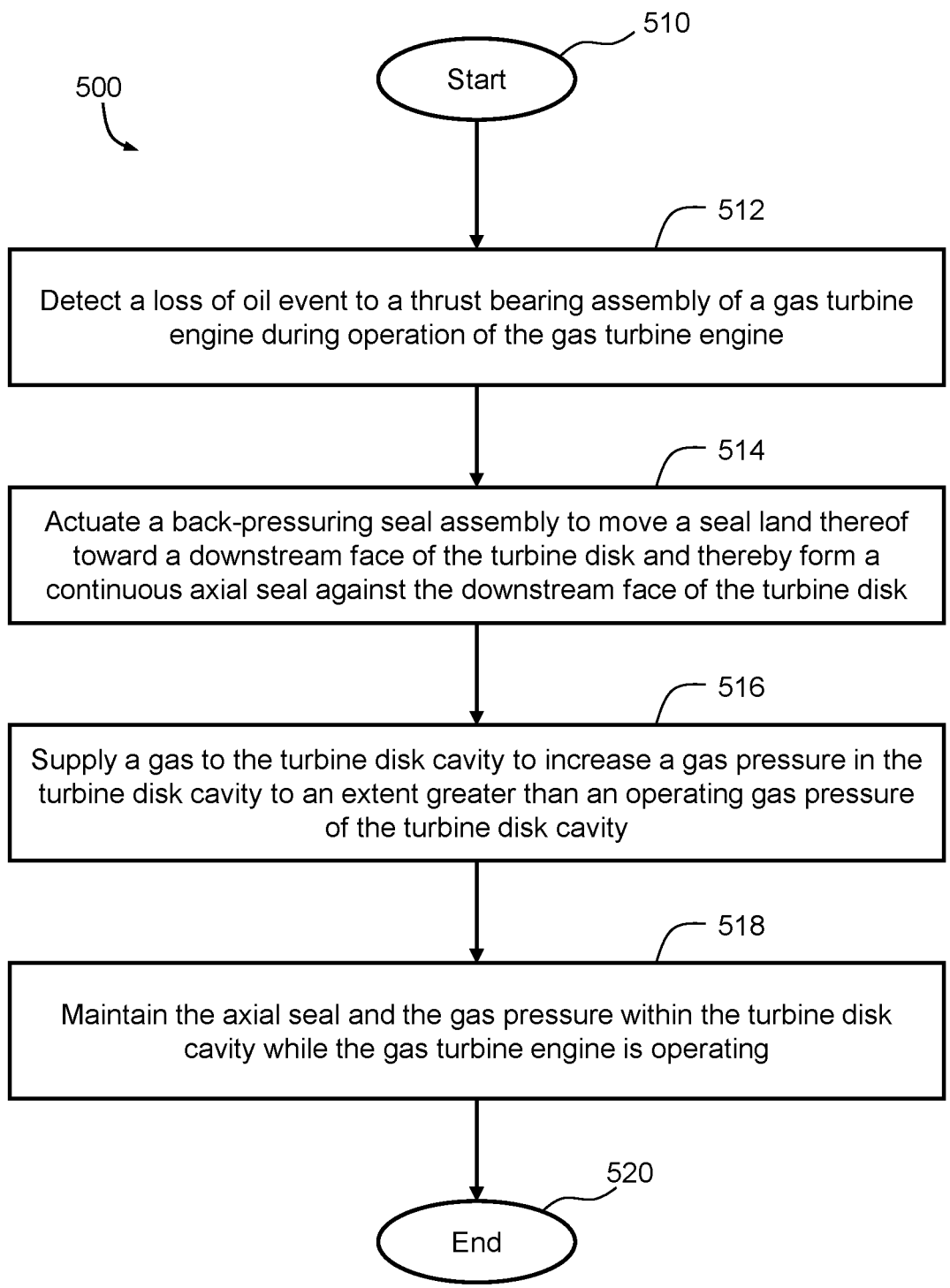
FIG. 5 is a flowchart illustrating a method of reducing spool thrust in a gas turbine engine in accordance with various embodiments.

The axial movement of the seal land 158 in response to the supply of the pressurized gas may be accomplished in various manners. In some embodiments, the back-pressuring seal assembly 156 may include an elastic element configured to move the seal land toward the downstream face of the turbine disk in response to the back-pressuring seal assembly receiving the pressurized gas. FIGS. 4 and 5 present nonlimiting examples that include use of a bellows 310 and a diaphragm 410, respectively, as the elastic element. Various components of the back-pressuring seal assembly 156 are omitted from FIGS. 4 and 5 for clarity. Further, the back-pressuring seal assembly 156 and the structures thereof configured to provide for axial movement of the seal land 158 are not limited to the examples of FIGS. 4 and 5. In some embodiments, the back-pressuring seal assembly 156 includes a single, unitary elastic element configured to axially move an entirety of the seal land 158 in response to the back-pressuring seal assembly 156 receiving the pressurized gas. In some embodiments, the pressurized gas may be directed from the compressor discharge or the combustor plenum.

Figure 3:
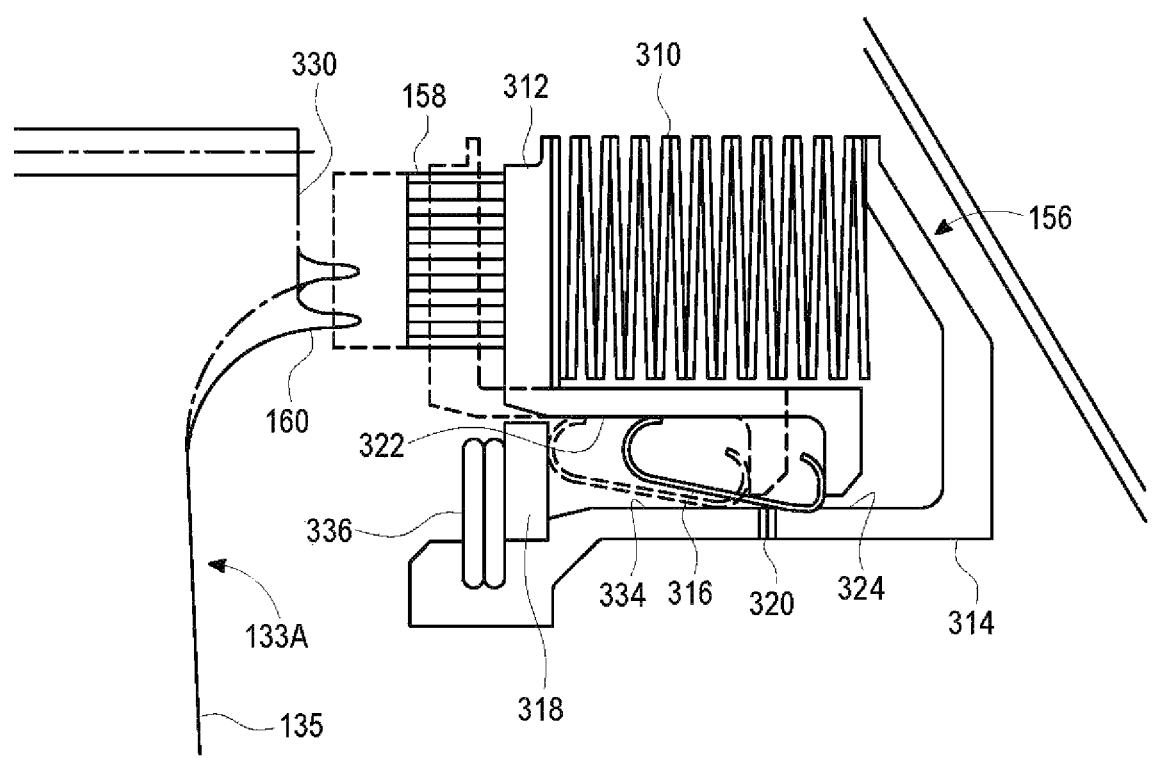
FIG. 3 is a detail cross-sectional view which illustrates certain components of an exemplary pressure actuated seal land having a bellows in accordance with various embodiments.

Referring to FIG. 3, the back-pressuring seal assembly 156 includes first and second structural members 312 and 314. The first structural member 312 is configured to support the seal land 158 thereon such that the seal land 158 protrudes axially outward toward the knives 160 of the first turbine disk 133A. The first structural member 312 is also configured to support the bellows 310 between the first and second structural members 312 and 314. The bellows 310 is configured to receive the pressurized gas within a cavity thereof and, in response, expand in the axial direction. Since opposite ends of the bellows 310 are in contact with the first and second structural members 312 and 314, axial expansion of the of the bellows 310 produces an axial force biasing the first and second structural members 312 and 314 apart. In this example, the second structural member 314 is fixed and the first structural member 312 is configured to slide in the axial direction relative to the second structural member 314. As such, application of the axial force upon expansion of the bellows 310 results in axial movement of the first structural member 312 and therefore axial movement of the seal land 158 toward the first turbine disk 133A. An exemplary position of the various components, including the seal land 158, upon full expansion of the bellows 310 is represented with dashed lines in FIG. 3.

A biasing member 316 is provided between the first and second structural members 312 and 314, such as between a radially extending portion of the first structural member 312 and a stop 318 fixed to the second structural member 314. A snap ring 336 or other fastening device may be provided to axially secure the stop 318 in the second structural member 314. In some examples, the biasing member 316 is configured to provide a biasing force to maintain the initial (e.g., downstream) position of the first structural member 312 while the bellows 310 is contracted. Referring to FIG. 3, the biasing member 316 utilizes a detent formed by a first surface 324 which is located aft of one or more cooling holes 320 in the second structural member 314 and radially inboard of a second surface 334, which is located axially forward of the cooling hole(s) 320 on the second structural member 314. The biasing member 316 is preferentially held in the detent on the first surface 324 of the second structural member 314 at an aft radially inward end thereof and is preferentially held in contact with a third surface 322 of the first structural member 312 by the torsional spring rate of the biasing member 316. The torsional spring forces in the biasing member 316 preferentially holds the aft radially inward end of the biasing member 316 in the detent formed by the first surface 324 in the second structural member 314, which preferentially holds the first structural member 312 axially aft and thus biases the bellows 310 in a compressed state until the controller 142 actuates the valve 164 to supply the pressurized gas through the conduit 162 to an internal cavity of the back-pressuring seal assembly 156. In some examples, the biasing member 316 is configured to provide a biasing force to limit the axial movement of the first structural member 312 upon expansion of the bellows 310 such that the contact pressure of the seal land 158 against the downstream face of the first turbine disk 133A does not exceed a predetermined threshold. For example, the biasing member 316 may limit the axial movement of the first structural member 312 such that, upon expansion of the bellows 310, the seal land 158 contacts the knives 160 but does not contact a planar surface 330 upstream thereof. In this manner, rubbing of the seal land 158 and the first turbine disk 133A may be limited while the axial seal is maintained.

Referring to FIG. 4, the back-pressuring seal assembly 156 includes first and second structural members 412 and 414. The first structural member 412 is configured to support the seal land 158 thereon such that the seal land 158 protrudes axially forward toward the knives 160 of the first turbine disk 133A. The second structural member 414 may be secured to a fixed component of the back-pressuring seal assembly 156 or another fixed component of the gas turbine engine 100. The diaphragm 410 is located between the first and second structural members 412 and 414 and opposite sides of the diaphragm 410 are fixed to the first and second structural members 412 and 414.

The diaphragm 410 is configured to receive the pressurized gas within a cavity thereof and, in response, expand in the axial direction. Since opposite sides of the diaphragm 410 are in contact with the first and second structural members 412 and 414, axial expansion of the of the diaphragm 410 produces an axial force biasing the first and second structural members 412 and 414 apart. In this example, application of the axial force upon expansion of the diaphragm 410 results in axial movement of the first structural member 412 and therefore axial movement of the seal land 158 toward the first turbine disk 133A. An exemplary position of the various components, including the seal land 158, upon full expansion of the diaphragm 410 is represented with dashed lines in FIG. 4.

Once the turbine disk inner cavity 170 has been substantially sealed, the controller 142 supplies the pressurized gas to the turbine disk inner cavity 170 to increase a gas pressure in the turbine disk inner cavity 170 to an extent greater than an operating gas pressure of the turbine disk inner cavity 170. Various methods may be used to supply the pressurized gas to the turbine disk inner cavity 170. In some embodiments, one or more holes may be provided in the back-pressuring seal assembly 156 through which the pressurized gas used for actuation of the back-pressuring seal assembly 156 may enter the turbine disk inner cavity 170. For example, FIG. 3 presents the second structural member 314 as including the cooling hole(s) 320 through which the pressurized gas may exit the back-pressuring seal assembly 156 and enter the turbine disk inner cavity 170. Although not shown, the diaphragm 410 of FIG. 4 may include one or more holes therein through which the pressurized gas may exit the back-pressuring seal assembly 156 and enter the turbine disk inner cavity 170. In both of the above examples, the holes may be configured to allow the pressurized gas to exit the back-pressuring seal assembly 156 at a rate that maintains the bellows 310 or the diaphragm 410 as fully expanded.

In the above-noted examples, the pressurized gas supplied to the turbine disk inner cavity 170 is supplied from the same source as for actuation of the back-pressuring seal assembly 156. However, the spool thrust reduction system is not limited to this arrangement. In some embodiments, the pressurized gas may be supplied to the turbine disk inner cavity 170 through a separate inlet and/or from a separate source. In addition, the source(s) of the pressurized gas may be external to the gas turbine engine 100. In various embodiments, the source of the pressurized gas is independent from a region that is in fluid contact with an upstream side of the seal land 158.

In some embodiments, the controller 142 is configured to continue to supply the pressurized gas to the back-pressuring seal assembly 156 and the turbine disk inner cavity 170, or otherwise maintain the axial seal and the gas pressure within the turbine disk inner cavity 170 while the gas turbine engine 100 is operating. In some embodiments, the spool thrust reduction system is configured to exert a pressure on the downstream face of the first turbine disk 133A via the pressurized gas within the turbine disk inner cavity 170 sufficient to reduce spool thrust loads on the thrust bearings 154 of the thrust bearing assembly 152 by at least about 100 pound-force (lbf), such as between 100 lbf and 1000 lbf, such as 1000 lbf or more.

The gas turbine engines disclosed herein, including the gas turbine engine 100 having the back-pressuring seal assembly 156, provide for methods of reducing spool thrust during loss of oil events and thereby promoting extended operating life of the gas turbine engine 100. For example, FIG. 5 is a flow chart illustrating an exemplary method 500 for reducing spool thrust within the gas turbine engine 100. The method 500 may start at 510. One or more of the steps of the methods may be initiated, controlled, and/or performed by a controller using one or more processors (e.g., the controller 142).

At 512, the method 500 may include detecting a loss of oil event to the thrust bearing assembly 152 of the gas turbine engine 100 during operation of the gas turbine engine 100. At 514, the method 500 may include actuating the back-pressuring seal assembly 156 to move the seal land 158 thereof toward and contact the downstream face of the first turbine disk 133A and thereby form a continuous axial seal against the downstream face of the first turbine disk 133A. At 516, the method 500 may include supplying a gas to the turbine disk inner cavity 170 to increase a gas pressure in the turbine disk inner cavity 170 to an extent greater than an operating gas pressure of the turbine disk inner cavity 170. At 518, the method 500 may include maintaining the axial seal and the gas pressure within the turbine disk inner cavity 170 while the gas turbine engine 100 is operating. The method 500 may end at 520. In some embodiments, the method 500 ends when the gas turbine engine 100 ceases operation.

The gas turbine engines and methods disclosed herein provide various benefits over certain existing gas turbine engines and methods. For example, by sealing the turbine disk inner cavity 170 and supplying the pressurized gas thereto in response to detection of a loss of oil event, the thrust load on the thrust bearings 154 of the thrust bearing assembly 152 may be reduced. This reduction in thrust loading can reduce the rate of temperature increase of the thrust bearings 154 and thereby significantly extend the remaining operating life of the gas turbine engine 100. In some examples, this may allow an operator to cease operation of the gas turbine engine 100 prior to significant damage thereto. In examples wherein the gas turbine engine 100 is a component of an aircraft (e.g., the aircraft 99), the extended operating life may promote a safe landing of the aircraft prior to failure of the gas turbine engine 100. This may be particularly useful for aircraft that operate in dangerous regions, such as military or rescue aircraft. In such examples, the extended operating life may allow the aircraft to leave the dangerous region prior to landing.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine, comprising:
a turbine disk;
a shaft coupled to the turbine disk;
a turbine disk inner cavity downstream of the turbine disk;
a thrust bearing assembly mechanically coupled to the shaft and configured to mitigate axial loads on the shaft during operation of the gas turbine engine;
a back-pressuring seal assembly having a seal land; and
a controller configured to, by one or more processors, detect a loss of oil event to the thrust bearing assembly during operation of the gas turbine engine and, in response to detecting the loss of oil event, to:
actuate the back-pressuring seal assembly to move the seal land toward a downstream face of the turbine disk such that the seal land forms a continuous axial seal about the turbine disk inner cavity;
supply a pressurized gas to the turbine disk inner cavity to increase a gas pressure in the turbine disk inner cavity to an extent greater than an operating gas pressure of the turbine disk inner cavity; and
maintain the continuous axial seal and the gas pressure within the turbine disk inner cavity while the gas turbine engine is operating and thereby reduce the axial loads on the shaft.

2. The gas turbine engine of claim 1, wherein the controller is configured to, by the one or more processors, actuate the back-pressuring seal assembly by actuating a valve to supply the pressurized gas to the back-pressuring seal assembly and thereby move the seal land of the back-pressuring seal assembly toward the downstream face of the turbine disk to produce a sufficient sealing pressure to maintain the continuous axial seal.

3. The gas turbine engine of claim 2, wherein the back-pressuring seal assembly includes an elastic element configured to move the seal land toward the downstream face of the turbine disk in response to the back-pressuring seal assembly receiving the pressurized gas.

4. The gas turbine engine of claim 3, wherein the elastic element is a bellows or a diaphragm configured to receive the pressurized gas in a cavity thereof and expand in an axial direction relative to a rotational axis of the shaft.

5. The gas turbine engine of claim 3, wherein the seal land includes a continuous annular body encircling the shaft and the elastic element is configured to axially move an entirety of the seal land in response to the back-pressuring seal assembly receiving the pressurized gas.

6. The gas turbine engine of claim 1, wherein the controller is configured to, by the one or more processors, supply the pressurized gas from an external source independent from a turbine disk outer cavity that is in fluid contact with an upstream side of the seal land.

7. The gas turbine engine of claim 1, wherein the seal land includes a honeycomb face, the turbine disk includes knives protruding from the downstream face thereof, and the controller is configured to, by the one or more processors, actuate the back-pressuring seal assembly to cause the honeycomb face of the seal land to contact the knives or come within 0.254 mm of the turbine disk and thereby form the continuous axial seal.

8. The gas turbine engine of claim 1, further comprising a space between the seal land and the downstream face of the turbine disk that provides a flow path for gases to enter the turbine disk inner cavity, the controller is configured to, by the one or more processors, actuate the back-pressuring seal assembly to apply a differential pressure to the back-pressuring seal assembly to move the seal land axially toward the downstream face of the turbine disk in a direction normal to the flow path and thereby block the flow path.

9. The gas turbine engine of claim 1, wherein the controller is configured to, by the one or more processors, supply the pressurized gas within the turbine disk inner cavity to exert pressure on the downstream face of the turbine disk sufficient to reduce spool thrust loads on bearings of the thrust bearing assembly by 1000 force-pound (lbf) or more.

10. The gas turbine engine of claim 1, wherein the gas turbine engine is configured to power an aircraft.

11. A method, comprising:
detecting a loss of oil event to a thrust bearing assembly of a gas turbine engine during operation of the gas turbine engine, wherein the gas turbine engine includes a turbine disk, a shaft coupled to the turbine disk, and a turbine disk inner cavity downstream of the turbine disk, wherein the thrust bearing assembly is configured to mitigate axial loads on the shaft during operation of the gas turbine engine; and
in response to detecting the loss of oil event:
actuating, by a controller having one or more processors, a back-pressuring seal assembly to move a seal land of the back-pressuring seal assembly toward a downstream face of the turbine disk such that the seal land forms a continuous axial seal about the turbine disk inner cavity;
supplying a pressurized gas to the turbine disk inner cavity to increase a gas pressure in the turbine disk inner cavity to an extent greater than an operating gas pressure of the turbine disk inner cavity; and
maintaining the continuous axial seal and the gas pressure within the turbine disk inner cavity while the gas turbine engine is operating and thereby reduce the axial loads on the shaft.

12. The method of claim 11, wherein actuating the back-pressuring seal assembly includes actuating a valve to supply the pressurized gas to the back-pressuring seal assembly and thereby move the seal land of the back-pressuring seal assembly toward the downstream face of the turbine disk to produce a sufficient sealing pressure to maintain the continuous axial seal.

13. The method of claim 12, wherein the back-pressuring seal assembly includes an elastic element that moves the seal land toward the downstream face of the turbine disk in response to the back-pressuring seal assembly receiving the pressurized gas.

14. The method of claim 13, wherein the elastic element is a bellows or a diaphragm configured to receive the pressurized gas in a cavity thereof.

15. The method of claim 13, wherein the seal land includes a continuous annular body encircling the shaft and the elastic element axially moves an entirety of the seal land in response to the back-pressuring seal assembly receiving the pressurized gas.

16. The method of claim 11, further comprising supplying the pressurized gas from an external source independent from a turbine disk outer cavity that is in fluid contact with an upstream side of the seal land.

17. The method of claim 11, wherein actuating the back-pressuring seal assembly causes a honeycomb face of the seal land of the back-pressuring seal assembly to contact knives protruding from the downstream face of the turbine disk or come within 0.254 mm thereof and thereby form the continuous axial seal.

18. The method of claim 11, wherein prior to actuating the back-pressuring seal assembly, a space between the seal land and the downstream face of the turbine disk provides a flow path for air to enter the turbine disk inner cavity, wherein actuating the back-pressuring seal assembly includes applying a differential pressure to the back-pressuring seal assembly to move the seal land of the back-pressuring seal assembly axially toward the downstream face of the turbine disk in a direction normal to the flow path and thereby block the flow path.

19. The method of claim 11, wherein the pressurized gas within the turbine disk inner cavity exerts pressure on the downstream face of the turbine disk sufficient to reduce spool thrust loads on bearings of the thrust bearing assembly by 1000 force-pound (lbf) or more.

20. The method of claim 11, wherein the gas turbine engine is configured to power an aircraft.

* * * * *